United States Patent [19]

Hettel et al.

[11] Patent Number: 5,158,987
[45] Date of Patent: Oct. 27, 1992

[54] PROCESS FOR THE PREPARATION OF HIGHLY ELASTIC POLYURETHANE FLEXIBLE FOAMS AND THEIR USE AS UPHOLSTERY MATERIAL

[75] Inventors: Hans Hettel, Roesrath; Peter Haas, Haan, both of Fed. Rep. of Germany

[73] Assignee: Bayer Aktiengesellschaft, Leverkusen, Fed. Rep. of Germany

[21] Appl. No.: 737,638

[22] Filed: Jul. 30, 1991

[30] Foreign Application Priority Data

Aug. 3, 1990 [DE] Fed. Rep. of Germany ....... 4024669

[51] Int. Cl.$^5$ .............................................. C08G 18/14
[52] U.S. Cl. ..................................... 521/99; 521/137; 521/167
[58] Field of Search ........................... 521/99, 137, 167

[56] References Cited

U.S. PATENT DOCUMENTS

| | | | |
|---|---|---|---|
| 4,098,729 | 7/1978 | Kollmeier et al. | 521/128 |
| 4,139,503 | 2/1979 | Kollmeier et al. | 521/112 |
| 4,263,408 | 4/1981 | Meyborg et al. | 521/51 |
| 4,404,294 | 9/1983 | Wiedermann | 521/107 |
| 4,883,825 | 11/1989 | Westfall et al. | 521/112 |

FOREIGN PATENT DOCUMENTS 2072204 9/1981 United Kingdom .

Primary Examiner—Maurice J. Welsh
Attorney, Agent, or Firm—Joseph C. Gil; Richard E. L. Henderson

[57] ABSTRACT

The invention relates to a process for preparing highly elastic polyurethane flexible foams by the reaction of
 (a) polyisocyanates with
 (b) polyethers having a molecule weight of from 400 to 10,000 and containing at least two isocyanate-reactive hydrogen atoms,
in the presence of
 (c) water and
 (d) mixtures of crosslinking agents having a molecular weight of from 32 to 399 and containing at least two isocyanate-reactive hydrogen atoms, wherein said mixtures contain
  (I) alkanolamines and
  (II) amine-free polyols,
with the proviso that components (c) and (d) must be used together as an aqueous solution.

13 Claims, No Drawings

PROCESS FOR THE PREPARATION OF HIGHLY ELASTIC POLYURETHANE FLEXIBLE FOAMS AND THEIR USE AS UPHOLSTERY MATERIAL

BACKGROUND OF THE INVENTION

Polyurethane flexible foams of high elasticity ("HR foams") are prepared from polyols containing predominantly primary hydroxyl groups, polyisocyanates, water, organic blowing agents, activators, and crosslinking agents. Alkanolamines such as diethanolamine and triethanolamine have proved to be satisfactory crosslinking agents, but amine-free low molecular weight polyhydroxyl compounds such as glycerol, pentaerythritol, sorbitol, mannitol, and dulcitol are also suitable. These products are described, for example, in German Offenlegungsschrift 2,728,031 and U.S. Pat. No. 4,883,825, and their use for the preparation of HR foams is considered state of the art. U.S. Pat. No. 4,883,825 also describes the use of certain combinations of diethanolamine and polyhydroxy components as crosslinking agents for HR molded foams of low gross density.

Block foams of low compression resistance have previously been prepared with the aid of certain proportions of fluorochlorohydrocarbon blowing agents, mainly fluorotrichloromethanes, but this class of compounds is considered not to be ecologically harmless. It was, therefore, an object of the present invention to produce flexible HR block foams over a wide range of gross densities without the aid of fluorochlorohydrocarbons. It was surprisingly found that when preparing flexible, highly elastic block foams, the method of dosing the crosslinking agents is extremely important if stable foam having the desired profile of properties are to be obtained.

SUMMARY OF THE INVENTION

This invention relates to a process for the preparation of highly elastic polyurethane flexible foams comprising reacting
(a) polyisocyanates with
(b) polyethers having a molecular weight of from 400 to about 10,000 and containing at least two isocyanate-reactive hydrogen atoms,
in the presence of
(c) water and
(d) a mixture of crosslinking agents having a molecular weight of from 32 to 399 and containing at least two isocyanate reactive hydrogen atoms, wherein said mixture comprises
(I) alkanolamines and
(II) amine-free polyols,
optionally in the further presence of
(e) catalysts and
(f) known surface-active additives or flame retardants or other known auxiliary agents,
with the proviso that components (c) and (d) are used together as an aqueous solution.

DETAILED DESCRIPTION OF THE INVENTION

In the preferred embodiments of the invention, component (b) contains a proportion of polymer-modified polyols having a filler content in the total polymer mixture of from about 1 to about 12 parts (preferably 1 to 6 parts, more preferably 1 to 5 parts, and most preferably 3 to 5 parts) of pure filler, based on 100 parts of polyol. Preferred polymer-modified polyols are polyurea dispersions; grafted polyethers obtained by polymerization of styrene and/or acrylonitrile in polyols; and/or alkanolamine adducts of diisocyanates. The preferred crosslinking component (I) is diethanolamine and the preferred crosslinking component (II) is sorbitol. Components (I) and (II) are introduced together into the reaction mixture, preferably at a high pressure. It is also preferable to carry out the process within the isocyanate index range of from about 70 to about 113 (preferably from 70 to 110, more preferably from 80 to 105, and most preferably from 80 to 100).

In carrying out the process of the invention, the crosslinking component (I) is generally used in quantities of from about 0.2 to about 5.0 parts by weight (preferably 0.2-3.0 parts by weight and most preferably 0.5-1.5 parts by weight), based on 100 parts by weight of polyether component (b), and crosslinking component (II) is used in quantities of from about 0.2 to about 5.0 parts by weight (preferably 0.2-3.0 parts by weight and most preferably 0.5-1.5 parts by weight), also based on 100 parts by weight of polyether component (b). Both components are used together in a single aqueous solution, with water also serving as blowing agent.

The invention also relates to the use of the highly elastic polyurethane flexible foams as upholstery material.

The following materials are used for carrying out the process according to the invention. Suitable polyisocyanates for use as component (a) of the invention include aliphatic, cycloaliphatic, araliphatic, aromatic, and heterocyclic polyisocyanates such as those described, for example, by W. Siefken in *Justus Liebigs Annalen der Chemie*, 362, pages 75 to 136. Examples of suitable such polyisocyanates include those corresponding to the formula $$Q(NCO)_n$$

in which n is 2 to 5 (preferably 2 to 3), and Q is an aliphatic hydrocarbon group having 2 to about 18 (preferably 6 to 10) carbon atoms, a cycloaliphatic hydrocarbon group having 4 to about 15 (preferably 5 to 10) carbon atoms, an aromatic hydrocarbon group having 6 to about 15 (preferably 6 to 13) carbon atoms, for example, polyisocyanates of the type described in German Offenlegungsschrift 2,832,253 at pages 10 to 11.

In general, it is particularly preferred to use commercially readily available polyisocyanates such as 2,4- and 2,6-toluene diisocyanate and any mixtures of these isomers ("TDI"). It is also preferred to use monomeric and polymeric diphenylmethane diisocyanates or mixtures thereof with TDI.

Suitable polyethers for use as component (b) of the invention ("polyol component") include polyethers having a molecular weight of from 400 to 10,000 and containing at least two active hydrogen atoms, preferably in the form of primary hydroxyl groups, generally polyethers based on propylene oxide or propylene oxide/ethylene oxide mixtures. These polyethers may also contain a proportion of other alkylene oxide groups. These polyethers include known relatively high molecular weight polyethers.

A proportion (up to about 50% by weight) of known "polymer-modified" polyols may be included in component (b). It is preferred to use dispersions of (1) relatively high molecular weight polymer-containing hydroxyl compounds that have been prepared by the reaction of mono- and/or polyisocyanates with polyamines containing primary and/or secondary amino groups, hydrazines, hydrazides, and/or alkanolamines in (2) compounds having a molecular weight of from 400 to about o 10,000 and containing 1 to about 8 primary and/or secondary hydroxyl groups. Such dispersions of relatively high molecular weight polymer-containing hydroxyl compounds are described, for example, in German Auslegeschrift 2,519,004, German Offenlegungsschriften 2,550,796, 2,550,797, 2,550,833, 2,550,862, 2,638,759, and 2,639,254, U.S. Pat. Nos. 4 374 209 and 4,381,351, and European Patent Application 79,115.

Dispersions of reaction products of polyisocyanates and alkanolamines in polyethers (e.g., German Offenlegungsschrift 3,103,757) and dispersions of homopolymers or copolymers of unsaturated monomers, such as styrene or acrylonitrile, in polyethers (so-called "polymer polyols") may also be used. The invention could in principle also be carried out with the sole use of "active" relatively high molecular weight hydroxyl compounds, that is, compounds containing predominantly primary OH groups and not containing any dispersed relatively high molecular weight components. Active polyols of this type are known.

Aqueous solutions of an alkanolamine (I) and an amine-free polyol (II) are used as blowing agent (attributable to the presence of water, component (c)) and as crosslinking agent (attributable to the presence of component (d)), preferably in a 1:1 ratio. Dispersion is preferably carried out by injection of the aqueous solution into the stream of polyol (i.e., component (b)) under high pressure conditions.

Suitable alkanolamines (I) according to the invention include diethanolamine, triethanolamine, diisopropanolamine, triisopropanolamine, and hydroxyethyl-hydroxypropylamine. Suitable compounds for use as crosslinking component (II) include glycerol, pentaerythritol, sorbitol, mannitol, and dulcitol. The amine-free polyol (II) is generally free from ether groups and generally has an OH number of from about 500 to about 2000.

Compounds used as components (I) and (II) generally have from 2 to about 8 (preferably from 2 to 4) isocyanate-reactive hydrogen atoms. Further examples of these compounds are described, for example, in German Offenlegungsschrift 2,832,253 at pages 19 to 20.

Optional catalysts (e) include known aminic or organometallic catalysts, preferably organic Sn(II) and/or Sn(IV) compounds, particularly Sn(II) salts of higher carboxylic acids.

Optional component (f) are known surface-active and flame-retarding additives and other known auxiliary agents, and includes emulsifiers and foam stabilizers; reaction retarders; known cell regulators, such as paraffins or fatty alcohols or dimethyl-polysiloxanes; pigments or dyes; known flame retardants, such as tris(-chloroethyl) phosphate or tricresyl phosphate; stabilizers against aging and weathering; plasticizers; fungistatic and bacteriostatic substances; and fillers, such as barium sulphate, kieselguhr, carbon black, or whiting. Also included are known organic blowing agents.

Further examples of optional additives used according to the invention, such as surface-active additives, foam stabilizers, cell regulators, reaction retarders, stabilizers, flame retardants, plasticizers, dyes, fillers and fungistatic and bacteriostatic substances, as well as details concerning the use and mode of action of these additives, are described in Kunststoff-Handbuch, Volume VII, published by Vieweg and Hochtlen, Carl-Hanser-Verlag, Munich 1966, for example, on pages 103 to 113.

When carrying out the process according to the invention, the components are reacted together by the known one-shot process, prepolymer process, or semi-prepolymer process, often using mechanical devices such as those described in U.S. Pat. No. 2,764,565. Details concerning the processing apparatus which may be used according to the invention are given in Kunststoff-Handbuch, Volume VII, published by Vieweg and Hochtlen, Carl-Hanser-Verlag, Munich 1966, for example, on pages 121 to 205.

It has been found important for the preparation of flexible types of foam to use the crosslinking components (I) and (II) only as a single aqueous solution containing both components. If the crosslinking components (I) and (II) are supplied separately to the mixing chamber (that is, in separate streams), the result is an unstable foam mixture that collapses after a short time. An unstable foam mixture is also obtained if the aqueous solution is not sufficiently dispersed in the polyol stream. The use of a single solution of both components of the crosslinking mixture thus enables flexible foams to be prepared using a greatly reduced proportion of the fillers that are normally required for stabilization and using water as the only blowing agent. In addition, this process is extremely reliable in that it provides a sufficient margin between shrinkage and collapse.

The polyurethane flexible foams obtainable according to the invention generally have gross densities of from about 13 to about 35 kg/m$^3$ (preferably from 15 to 35 and more preferably from 16 to 30 kg/m$^3$) and are preferably used as upholstery materials.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components are employed in the known reaction technique for the preparation of the polyurethane foams.

EXAMPLE 1

| | |
|---|---|
| 80 parts | polyether having an OH number of 35 and containing about 50% primary OH groups and based on trimethylolpropane, propylene oxide, and ethylene oxide |
| 20 parts | a 20% dispersion of a polyurea of hydrazine and toluene diisocyanate in an active polyether of trimethylolpropane, propylene oxide, and ethylene oxide having an OH number of 30 |
| 7.5 parts | aqueous crosslinking mixture (I)/(II) composed of 5.0 parts of water, 1.2 parts of diethanolamine, 1.2 parts of sorbitol, and 0.1 part of DABCO ® 33LV (available from Houdry Hüls) |
| 0.5 parts | stabilizer KS 67 (available from Bayer AG) based on a short-chain polyether modified silicone |
| 0.1 part | tin ethylhexoate |
| 51.0 parts | toluene diisocyanate ("TDI 80") composed of 80% of 2,4- and 20% of 2,6-isomers |
| Isocyanate index | 85 |

A highly elastic foam was prepared, which could be obtained in a membrane-free form by the usual light application of surface pressure, crushing by hand or any suitable mechanical equipment (i.e., calendar).

Gross density: 20 kg/m³
Compression resistance: 1.0 kPa at 40% deformation
Compression set: 10% at 90% deformation.

In conventional formulations, such hardness can normally be obtained only by using about 17 parts of fluorotrichloromethane.

EXAMPLE 2

Comparison Example using separate introduction of crosslinking agents

| | |
|---|---|
| 80 parts | polyether of Example 1 |
| 20 parts | polyether dispersion of Example 1 |
| 1.2 parts | diethanolamine (crosslinking agent (I)) |
| 1.5 parts | 80% aqueous solution of sorbitol (crosslinking agent (II)) |
| 4.7 parts | water |
| 0.1 part | activator DABCO ® 33LV (Houdry Hüls) |
| 0.1 part | tin ethylhexoate |
| 0.5 parts | stabilizer of Example 1 |
| 51.0 parts | TDI 80 |
| Isocyanate index | 85 |

The foam broke down during the rising phase due to insufficient stability.

EXAMPLE 3

| | |
|---|---|
| 80 parts | polyether of Example 1 |
| 20 parts | polyether dispersion of Example 1 |
| 6.4 parts | aqueous crosslinking mixture (I)/(II) composed of 3.9 parts of water, 1.2 parts of diethanolamine, 1.2 parts of sorbitol, and 0.1 part of DABCO ® 33LV |
| 0.5 parts | stabilizer of Example 1 |
| 0.1 part | tin ethylhexoate |
| 41.5 parts | TDI 80 |
| Isocyanate index | 85 |

A highly elastic foam resulted, which could be obtained membrane-free by the usual light application of surface pressure.

Gross density: 25 kg/m³
Compression resistance: 1.2 kPa
Compression set: 6%

Such hardness can be obtained in conventional formulations only by using about 14 parts of fluorotrichloromethane.

EXAMPLE 4

Comparison Example Using Separate Introduction of the Crosslinking Agents

| | |
|---|---|
| 80 parts | polyol of Example 1 |
| 20 parts | polyol dispersion of Example 1 |
| 1.2 parts | diethanolamine (crosslinking agent (I)) |
| 1.5 parts | 80% aqueous solution of sorbitol (crosslinking agent (II)) |
| 3.6 parts | water |
| 0.1 part | DABCO ® 33LV |
| 0.1 part | tin ethylhexoate |
| 0.5 part | stabilizer of Example 1 |
| 41.5 parts | TDI 80 |
| Isocyanate index | 85 |

The foam broke down during the rising phase due to insufficient stability.

EXAMPLE 5

| | |
|---|---|
| 80 parts | polyol of Example 1 |
| 20 parts | polyol dispersion of Example 1 |
| 6.0 parts | aqueous crosslinking mixture (I)/(II) composed of 3.9 parts of water, 1.0 parts of diethanolamine, 1.0 parts of sorbitol, and 0.1 part of DABCO ® 33LV |
| 0.5 parts | stabilizer of Example 1 |
| 0.1 part | tin ethylhexoate |
| 47.5 parts | TDI 80 |
| Isocyanate index | 100 |

A highly elastic foam was prepared, which could be obtained membrane-free by the usual light application of surface pressure.

Gross density: 24 kg/m³
Compression resistance: 1.7 kPa
Compression set: 6%.

With conventional formulations, such hardness can be obtained only by using about 8 parts of fluorotrichloromethane.

EXAMPLE 6

Comparison Example Using Separate Introduction of the Crosslinking Agents

| | |
|---|---|
| 80 parts | polyol of Example 1 |
| 20 parts | polyol dispersion of Example 1 |
| 1.0 part | diethanolamine (crosslinking agent (I)) |
| 1.25 parts | 80% aqueous solution of sorbitol (crosslinking agent (II)) |
| 3.65 parts | water |
| 0.1 part | DABCO ® 33LV |
| 0.5 parts | stabilizer of Example 1 |
| 4.75 parts | TDI 80 |
| Isocyanate index | 100 |

The foam broke down during the rising phase due to lack of stability.

What is claimed is:

1. A process for the preparation of a highly elastic polyurethane flexible foam comprising reacting
   (a) a polyisocyanate with
   (b) a polyether having a molecular weight of from 400 to 10,000 and containing at least two isocyanate-reactive hydrogen atoms,
in the presence of
   (c) water and
   (d) a mixture of crosslinking agents having a molecular weight of from 32 to 399 and containing at least two isocyanate-reactive hydrogen atoms, wherein said mixture comprises
      (I) an alkanolamine and
      (II) an amine-free polyol,
optionally in the further presence of
   (e) a catalyst and
   (f) known surface-active additives or flame retardants or other known auxiliary agents,
with the proviso that components (c) and (d) are used together as an aqueous solution.

2. A process according to claim 1 wherein component (b) contains a proportion of a polymer-modified polyol having a filler content in the total polymer mixture of from 1 to 12 parts, based on 100 parts of the polyol.

3. A process according to claim 2 wherein the polymer-modified polyol is a polyurea dispersion.

4. A process according to claim 2 wherein the polymer-modified polyol is a grafted polyether obtained by the polymerization of styrene and/or acrylonitrile in the polyol.

5. A process according to claim 2 wherein the polymer-modified polyol is an alkanolamine adduct of a diisocyanate.

6. A process according to claim 1 wherein the alkanolamine component (I) is diethanolamine.

7. A process according to claim 1 wherein the amine-free polyol component (II) is sorbitol.

8. A process according to claim 1 wherein the alkanolamine component (I) and the amine-free polyol component (II) are introduced together into the reaction.

9. A process according to claim 1 wherein the alkanolamine component (I) and the amine-free polyol component (II) are introduced together into the reaction under high pressure.

10. A process according to claim 1 wherein the reaction is carried out at an isocyanate index of from 70 to 113.

11. A process according to claim 1 wherein the reaction is carried out at an isocyanate index of from 80 to 105.

12. A process according to claim 1 wherein from 0.2 to 5.0 parts by weight, based on 100 parts by weight of the polyether component (b), of the alkanolamine component (I) and from 0.2 to 5.0 parts by weight, based on 100 parts by weight of the polyether component (b), of the amine-free polyol component (II) are used together as a single aqueous solution.

13. An upholstery material consisting of one or more flexible polyurethane foams prepared according to claim 1.

* * * * *